(12) United States Patent
Kalogroulis et al.

(10) Patent No.: US 7,533,838 B2
(45) Date of Patent: May 19, 2009

(54) SPICE MILL

(75) Inventors: Alexander Joseph Kalogroulis, Coulsdon (GB); Matthew Edward White, Balcombe (GB)

(73) Assignee: Daka Research Inc. (Br. Virg.Isl Corp.), Tortolla (VG)

(*) Notice: Subject to any disclaimer, the term of this patent is extended or adjusted under 35 U.S.C. 154(b) by 61 days.

(21) Appl. No.: 11/731,301

(22) Filed: Mar. 30, 2007

(65) Prior Publication Data

US 2008/0237380 A1 Oct. 2, 2008

(51) Int. Cl.
*A47J 42/06* (2006.01)
(52) U.S. Cl. .................................. 241/169.1
(58) Field of Classification Search ............... 241/169.1
See application file for complete search history.

(56) References Cited

U.S. PATENT DOCUMENTS

| | | | | |
|---|---|---|---|---|
| 4,925,150 A * | 5/1990 | Tedioli | ..................... | 241/169.1 |
| D318,779 S * | 8/1991 | Wong | | |
| 7,380,737 B2 * | 6/2008 | Wang | ..................... | 241/169.1 |

* cited by examiner

*Primary Examiner*—Mark Rosenbaum
(74) *Attorney, Agent, or Firm*—Curtis L. Harrington; Kathy E. Harrington; Harrington & Harrington

(57) ABSTRACT

A spice mill uses one touch button control and a common driven shaft to operate a pair of oppositely disposed grinding mills simultaneously. In environments which are more sophisticated and formal, the users will know which spice will be dispensed through the slightly smaller end and which spice will be dispensed through the slightly larger end, and without having to label the dispenser. In addition, the one touch button is large and easily accessible by almost any finger of the hand used to hold the center section.

4 Claims, 1 Drawing Sheet

SPICE MILL

FIELD OF THE INVENTION

The present invention relates to improved technology and conveniences in the field of grinding mills and more particularly to a hand-held, double ended, two spice grinding dispenser which is motorized to enable a user operate the mill by inverting the spice to be dispensed and pushing a single button while using minimal strength and effort.

BACKGROUND OF THE INVENTION

Numerous kinds of spice mills are utilized to both grind product in bulk and to grindingly dispense fresh spice products directly onto food. Small portable spice mills are used to provide a recent breaking apart of the spices to provide an enhanced smell and flavor experience. In the alternative, less spice is needed when it is fresh and freshly ground as the smell and taste components are more reactive and less stale.

The typical small grinder involves a device having a user crank a handle or knob connected to a shaft which moves one turn able component of a pair of grinding surfaces. When one grinding component is turned against the other while the spice is gravity fed into the grinding interspace, the crushed breaking apart of the spice occurs as it is broken into smaller pieces. Most grinding arrangements enable smaller pieces to fall from the grinding members once the pieces are ground to the smallest size. As such, the only two steps for grinding is to position the grinder to cause the spices to be ground to fall into the grinding mechanism, and then turn the grinding mechanism to effect grinding.

This action typically requires both hands even where the spice mill is highly mechanically advantaged. This is a particular problem in the restaurant setting where a server will likely also carry a number of other materials, including other plates, pens, pads and trays. The ability, especially in a restaurant setting, to quickly dispense a limited amount of spice is valuable.

Although some limited amount of ground particles may fall from the grinding components when a grinder is simply moved or placed on a table surface, the leakage is minimal. The significant amount of spice comes from between the grinding components of the grinding mechanism based upon size reduction from grinding action. Grinding action using annularly opposing components which define an annular tapering space require a gravity feed of the spices.

Where it is desired to have a number of spices, separate spice mills for each component are typically provided. The amount of time to open a grinder, remove the uncrushed and partially crushed spice present, followed by replacing the spice and begin grinding; is time consuming. As a result, providing a series of separate spice mills is duplicative. Duplication occurs for the battery supply, for the gearing, the motor and grinder drive shaft.

The ability to provide a finer spice not only enables the use of less spice for the same level of taste, but also enables a lesser use of spices which are not healthy in higher amounts, such as salt. The ability to provide a salt garnish in lesser amounts than would be present permeating a dish and yet give the same salt taste is desirable. The same is true for hot spices. The finer the grind, the lesser of the gastric challenging hot spice is necessary to achieve the same level of taste, all other things being equal.

U.S. Pat. No. 4,925,150 entitled Electric grinder for Pepper for Salt uses an offset shaft 27 and creates a device so wide that it cannot be utilized with one hand. The device has a reciprocal helical connection device, with a separate shaft and gear mechanism to reverse the direction of turning and transmit this to a second unit.

What is needed is a device which enables the use of spice to be accomplished more easily and more sparingly and which does not require the user to use both hands when operating the spice mill. It is preferable for a desired spice mill to be able to be able to dispense more than one spice without subjecting the spices to intermixing. The needed device should have a simple mechanism and allow the user to unambiguously control which spice is to be dispensed at any given time. The needed spice grinding and dispensing device should be supportable and operable with one hand, and any reciprocal mechanism and additional side shafting should be eliminated.

SUMMARY OF THE INVENTION

The spice mill of the present invention uses one touch button control and a common driven shaft to operate a pair of oppositely disposed grinding mills simultaneously. However, during use, one grinding mechanism is directed downwardly to dispense ground spice while the other is directed upwardly to cause the spice to disengage from the upwardly directed grinder. As a result, the motor, reduction gears and grinding shaft will only experience and have to drive the force of one grinding mechanism at a time. The upwardly directed grinding mechanism will have the spices fall away from it and it will spin freely while the downwardly directed mill is engaged to grind and dispense the spice below. Thus the only action needed by the person using the spice mill is which way to vertically orient it before pressing the one touch activation button to start the spice grinding.

Since spice grinding occurs in either direction with respect to a grinder, the gear set and motor can be set to move in one direction and thus no special switching is involved. In the spice mill of the invention, a distinctive shape which is only nearly symmetrical provides a first end which has a slightly smaller diameter than a second end. Thus, in environments which are more sophisticated and formal, the users will know which spice will be dispensed through the slightly smaller end and which spice will be dispensed through the slightly larger end, and without having to label the dispenser. In addition, the one touch button is large and easily accessible by almost any finger of the hand used to hold the center section.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
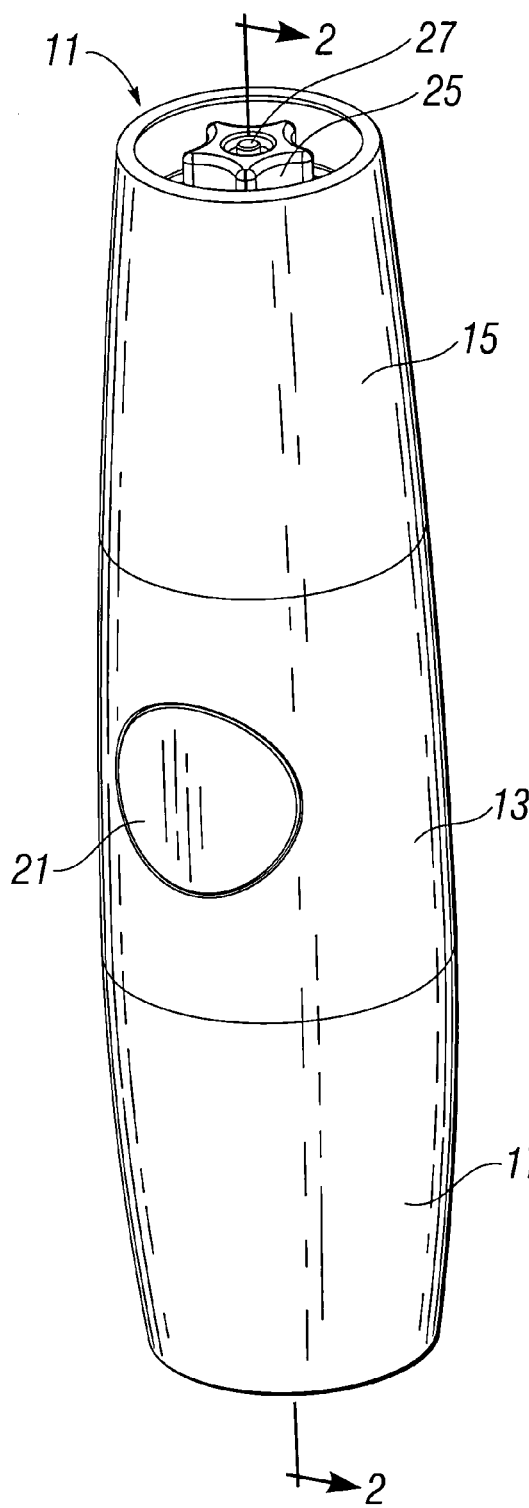
FIG. 1 is a perspective view of the spice mill of the present invention seen vertically oriented with the slightly smaller diameter end oriented upwardly.

The description and operation of the invention will be best initiated with reference to FIG. 1, which is a perspective view of a spice mill 11. FIG. 1 illustrates spice mill 11 as having a middle housing portion 13, a more angularly tapered more narrow housing portion 15 and a larger diameter more abruptly tapered housing portion 17. Located on the middle housing portion 13, a large button 21 is prominently situated.

At the top of the more angularly tapered more narrow housing portion 15 a grind fitting nut 25 is seen threadably engaged onto a shaft 27. The fitting nut 25 may rotate while the spice is being dispensed.

Figure 2:
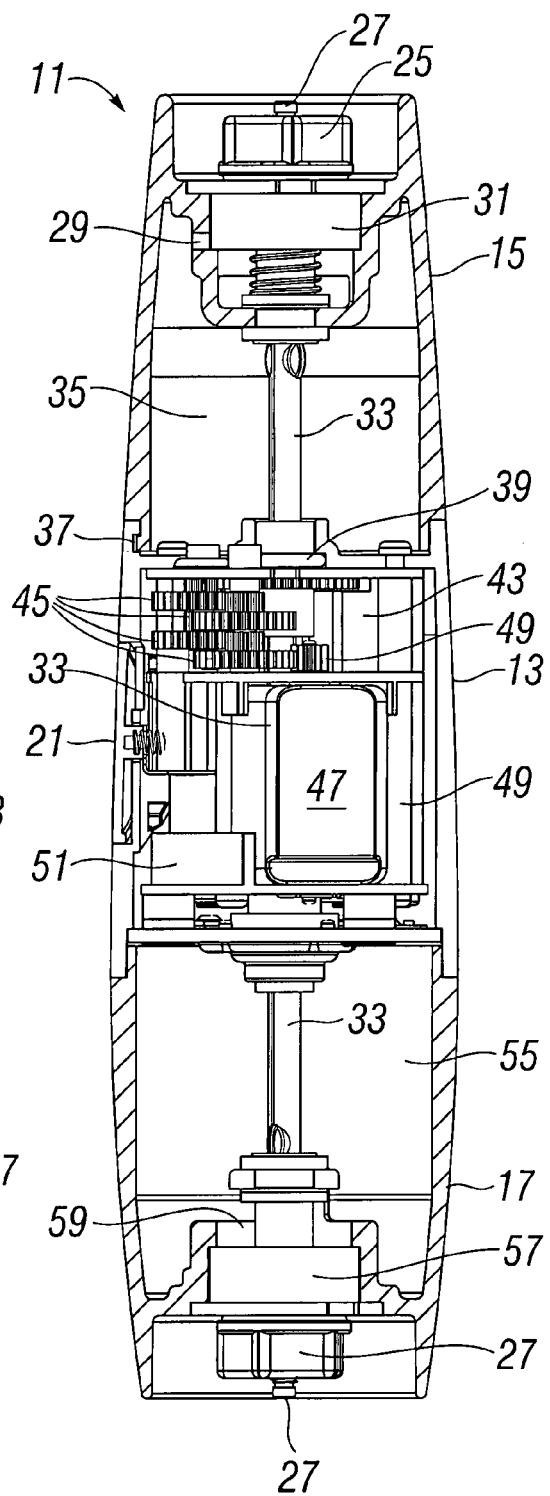
FIG. 2 is a sectional view taken along line 2-2 of FIG. 1 and illustrating internals of the spice mill.

Referring to FIG. 2, a number of features of the spice mill 11 can be seen. An entrance opening 29 to first grinding section 31 is seen. First grinding section 31 may include a pair of grinding wheels or a scraping member or similar rotary operated grinding. Entrance opening 29 can admit spice from a first spice loading storage and hopper area 35. The more angularly tapered more narrow housing portion 15 can be seen as separable from the middle housing portion 13 preferably with a bayonet type fitting a portion of the bayonet fitting 37 is seen. A seal 39 protects a reduction gear housing 43 having a series of reduction gears 45. Below the reduction gear housing 43, a motor 47 is located in a battery and electrical housing 49. A battery 51 is located in the battery and electrical housing 49 and electrically connects the large button 21 with the motor 47.

Below the battery and electrical housing 49 a second spice loading storage and hopper area 55 is located. The larger diameter more abruptly tapered housing portion 17 can be seen as separable from the middle housing portion 13 preferably with a further bayonet type fitting a portion of the bayonet fitting 37 (which is not seen in FIG. 2). The direction of turn for unlocking the more angularly tapered more narrow housing portion 15 with respect to the middle housing portion 13 should be opposite the direction of turn for unlocking the larger diameter more abruptly tapered housing portion 17 from the middle housing portion 13 because the shaft 33 will turn in only one direction. The bayonet closure direction for each of the more angularly tapered more narrow housing portion 15 and the larger diameter more abruptly tapered housing portion 17 should be in the same direction as the turning of the shaft 33.

Internal seals not seen help seal shaft 33 against any leakage of spice into the battery and electrical housing 49. A second grinding section 57, may include an entrance opening 59 to admit spice from the second spice loading storage and hopper area 35.

At the end of the larger diameter more abruptly tapered housing portion 17, a further grind fitting nut 25 and threaded shaft 27 is seen. In operation, battery 51 can be replaceable or re-chargeable. The opening of the more angularly tapered more narrow housing portion 15 or larger diameter more abruptly tapered housing portion 17 from the middle housing portion 13 will result in disengagement of the shaft 33 from the respective grinding sections 31 and 57. For use, once the first and second spice loading storage and hopper area 35 and 55 are loaded and the battery 51 is in place, a user need only hold the spice mill 11 over the area to be sprinkled with spice and press the large button 21.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A spice mill comprising:
   a middle housing portion supporting a motor having two ends;
   a single set of a plurality of reduction gears connected adjacent one end of said motor;
   a common shaft having a first and a second end and rotationally supported by said middle housing portion at a center of said middle housing portion and mechanically driven by said single set of a plurality of reduction gears;
   a first end housing portion attached to said middle housing portion and including a first spice loading storage and hopper area;
   a first grinding section supported within said first end housing portion and driven by said first end of said common shaft;
   a second end housing portion attached to said middle housing portion and including a second spice loading storage and hopper area;
   a second grinding section supported within said second end housing portion and driven by said second end of said common shaft.

2. The spice mill as recited in claim 1 and wherein the middle housing portion supports a single contact button which is operably connected to energize said motor to turn in one direction only.

3. The spice mill as recited in claim 1 and wherein each of the first and second end housing portions are attached to the middle housing portion using bayonet type fitting arranged such that a direction of turn for unlocking said first and second end housing portions is opposite a direction of turn of said common shaft.

4. The spice mill as recited in claim 1 and wherein said first and second grinding sections each have annularly opposing components which and an annular tapering space which require a gravity feed, such that when one of said first and said second grinding sections is positioned over the other of said first and said second grinding sections, grinding will not occur because it will be oppositely oriented to permit a gravity feed.

* * * * *